(12) United States Patent
Tomomatsu et al.

(10) Patent No.: US 10,767,761 B2
(45) Date of Patent: Sep. 8, 2020

(54) CONTROL APPARATUS FOR VEHICLE DRIVING APPARATUS

(71) Applicant: TOYOTA JIDOSHA KABUSHIKI KAISHA, Toyota-shi, Aichi (JP)

(72) Inventors: Daisuke Tomomatsu, Toyota (JP); Tomohiro Kondo, Toyota (JP); Kyohei Suzumura, Toyota (JP); Jun Hakamagi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/519,888

(22) Filed: Jul. 23, 2019

(65) Prior Publication Data

US 2020/0040991 A1 Feb. 6, 2020

(30) Foreign Application Priority Data

Aug. 6, 2018 (JP) ................................ 2018-148009

(51) Int. Cl.
| | | |
|---|---|---|
| *F16H 61/662* | (2006.01) | |
| *B60W 30/188* | (2012.01) | |
| *B60W 10/101* | (2012.01) | |
| *B60W 10/11* | (2012.01) | |
| *B60W 10/06* | (2006.01) | |

(Continued)

(52) U.S. Cl.
CPC ....... *F16H 61/66272* (2013.01); *B60W 10/06* (2013.01); *B60W 10/101* (2013.01); *B60W 10/11* (2013.01); *B60W 30/188* (2013.01); *B60W 30/1819* (2013.01);

(Continued)

(58) Field of Classification Search
CPC ............ F16H 61/662; F16H 61/66272; F16H 2061/66277; B60W 10/107; B60W 30/20
See application file for complete search history.

(56) References Cited

U.S. PATENT DOCUMENTS

| | | | | |
|---|---|---|---|---|
| 8,798,882 B2* | 8/2014 | Monfette | ............ | B60W 10/107 474/28 |
| 2012/0135829 A1* | 5/2012 | Doihara | ............ | F16H 61/66272 474/28 |

(Continued)

FOREIGN PATENT DOCUMENTS

JP 2017-36782 A 2/2017

*Primary Examiner* — Edwin A Young
(74) *Attorney, Agent, or Firm* — Oliff PLC

(57) ABSTRACT

A control apparatus for a vehicle driving apparatus includes: a first-operating-state determining portion configured to determine whether the driving apparatus is in a first operating state, by determining (i) whether a first drive-force transmitting path is established to cause a drive force to be transmitted through a gear mechanism and (ii) whether there is a probability of generation of noises between an input shaft and an continuously-variable transmission; and a belt-clamping-force controlling portion configured to control a belt clamping force of the continuously-variable transmission, when it is determined that the driving apparatus is in the first operating state, to start execution of a belt-clamping-force increasing control for increasing the belt clamping force such that the belt clamping force is made larger when the driving apparatus is in the first operating state than when the driving apparatus is in an operating state that is different from the first operating state.

7 Claims, 5 Drawing Sheets

(51) Int. Cl.
*F16H 63/50* (2006.01)
*B60W 30/18* (2012.01)

(52) U.S. Cl.
CPC ....... *F16H 63/50* (2013.01); *B60W 2710/065* (2013.01); *F16H 2061/66277* (2013.01)

(56) References Cited

U.S. PATENT DOCUMENTS

| | | |
|---|---|---|
| 2017/0037966 A1 | 2/2017 | Nakamura |
| 2017/0204970 A1* | 7/2017 | Honma ............. F16H 61/66272 |
| 2017/0219096 A1* | 8/2017 | Abe ........................ F16H 59/40 |

* cited by examiner

CONTROL APPARATUS FOR VEHICLE DRIVING APPARATUS

This application claims priority from Japanese Patent Application No. 2018-148009 filed on Aug. 6, 2018, the disclosure of which is herein incorporated by reference in its entirety.

FIELD OF THE INVENTION

The present invention relates to a control apparatus for a vehicle driving apparatus in which a selected one of first and second drive-force transmitting paths is to be established between input and output shafts such that a drive force is transmitted through a gear mechanism when the first drive-force transmitting path is established and such that the drive force is transmitted through a belt-type continuously-variable transmission when the second drive-force transmitting path is established. More particularly, the invention is concerned with techniques for restraining rattle noises generated between the belt-type continuously-variable transmission and the input shaft.

BACKGROUND OF THE INVENTION

There is a vehicle driving apparatus including a drive force source (engine) and a drive-force transmitting apparatus configured to transmit a drive force of the drive force source to drive wheels, wherein a selected one of first and second drive-force transmitting paths is to be established between input and output shafts such that the drive force is transmitted through a gear mechanism when the first drive-force transmitting path is established and such that the drive force is transmitted through a belt-type continuously-variable transmission when the second drive-force transmitting path is established. In a vehicle equipped with such a vehicle driving apparatus, there is a case in which a clearance (play or backlash) is present in a spline connection between a primary pulley of the belt-type continuously-variable transmission and the input shaft through which the drive force is to be transmitted to the primary pulley. For example, when the vehicle driving apparatus is placed in a certain operating state (for example, operating state for vehicle running at a low speed) with the first drive-force transmitting path being established, there is a risk that uncomfortable feeling could be given to an operator of the vehicle, due to generation of rattle noises in the clearance in the spline connection. There is known a control apparatus for restraining the generation of the rattle noises, by controlling a connecting/disconnecting device that is to be engaged to establish the second drive-force transmitting path, such that the connecting/disconnecting device is placed in a semi-engaged state during running of the vehicle with the first drive-force transmitting path being established. For example, JP-2017-36782A discloses such a control apparatus for a vehicle driving apparatus.

SUMMARY OF THE INVENTION

By the way, in the above-described control apparatus for the vehicle driving apparatus, during running of the vehicle with the first drive-force transmitting path being established, the connecting/disconnecting device, which is to be placed in the engaged state for establishing the second drive-force transmitting path, is placed in its semi-engaged state. Therefore, when the drive-force transmitting path is switched from the first drive-force transmitting path to the second drive-force transmitting path, there is a risk that an engaging shock could be caused in the connecting/disconnecting device and/or the switching could be delayed, due to control interference in the connecting/disconnecting device.

The present invention was made in view of the background art described above. It is therefore an object of the present invention to provide a control apparatus for a vehicle driving apparatus, which is capable of restraining generation of rattle noises between a continuously-variable transmission and an input shaft of the vehicle driving apparatus, without causing control interference in a connecting/disconnecting device upon switching of a drive-force transmitting path.

The object indicated above is achieved according to the following aspects of the present invention.

According to a first aspect of the invention, there is provided a control apparatus for a vehicle driving apparatus that includes an input shaft, an output shaft, a gear mechanism and a continuously-variable transmission. The continuously-variable transmission includes pulleys and a transmission belt looped over the pulleys. The vehicle driving apparatus is configured to establish a selected one of first and second drive-force transmitting paths between the input and output shafts, such that a drive force is transmitted through the gear mechanism when the first drive-force transmitting path is established, and such that the drive force is transmitted through the continuously-variable transmission when the second drive-force transmitting path is established. The control apparatus includes: a first-operating-state determining portion configured to determine whether the vehicle driving apparatus is in a first operating state, by determining at least (i) whether the first drive-force transmitting path is established and (ii) whether there is a probability that noises are to be generated between the input shaft and the continuously-variable transmission, and configured to determine that the vehicle driving apparatus is in the first operating state when determining at least that the first drive-force transmitting path is established and that there is the probability; and a belt-clamping-force controlling portion configured to control a belt clamping force by which the transmission belt is clamped by each of at least one of the pulleys, and configured, when it is determined by the first-operating-state determining portion that the vehicle driving apparatus is in the first operating state, to start execution of a belt-clamping-force increasing control for increasing the belt clamping force such that the belt clamping force is made larger when the vehicle driving apparatus is in the first operating state than when the vehicle driving apparatus is in an operating state that is different from the first operating state. For example, the vehicle driving apparatus further includes an engine as a drive force source configured to generate the drive force, wherein the first-operating-state determining portion is configured to determine whether the vehicle driving apparatus is in the first operating state, by further determining at least whether a an opening degree of a throttle valve provided in the engine is larger than a given value, and to determine that the vehicle driving apparatus is in the first operating state when determining at least that the first drive-force transmitting path is established, that there is the probability and that the throttle opening degree is not larger than the given value. Further, for example, the first-operating-state determining portion is configured to determine whether there is the probability, based on at least a rotational speed of the input shaft of the vehicle driving apparatus and a temperature of a working fluid used in the vehicle driving apparatus.

According to a second aspect of the invention, in the control apparatus according to the first aspect of the invention, there is further provided a second-operating-state determining portion configured to determine whether the vehicle driving apparatus is in a second operating state which is different from the first operating state and in which the first drive-force transmitting path is established, wherein the belt-clamping-force controlling portion is configured, when it is determined by the second-operating-state determining portion that the vehicle driving apparatus is in the second operating state, to execute a belt-clamping-force reducing control for reducing the belt clamping force such that the belt clamping force is returned to an unincreased value that is a value before the execution of the belt-clamping-force increasing control.

According to a third aspect of the invention, in the control apparatus according to the second aspect of the invention, the belt-clamping-force controlling portion is configured to keep the execution of the belt-clamping-force increasing control, when the vehicle driving apparatus is placed in a third operating state that is different from the first and second operating states after it is determined by the first-operating-state determining portion that the vehicle driving apparatus is in the first operating state and before it is determined by the second-operating-state determining portion that the vehicle driving apparatus is in the second operating state.

According to a fourth aspect of the invention, in the control apparatus according to any one of the first through third aspects of the invention, the pulleys of the continuously-variable transmission include a primary pulley and a secondary pulley that is to receive the drive force transmitted from the input shaft through the primary pulley and the transmission belt, wherein the secondary pulley includes a hydraulic actuator that is configured to control a width of a V-shape groove of the second pulley, based on a hydraulic pressure supplied to the hydraulic actuator, and wherein the belt-clamping-force increasing control is a control executed to increase the hydraulic pressure supplied to the hydraulic actuator of the secondary pulley.

According to a fifth aspect of the invention, in the control apparatus according to any one of the first through fourth aspects of the invention, the vehicle driving apparatus further includes an engine as a drive force source configured to generate the drive force, at least one first connecting/disconnecting device configured to selectively connect and disconnect the first drive-force transmitting path, and at least one second connecting/disconnecting device configured to selectively connect and disconnect the second drive-force transmitting path, wherein the pulleys of the continuously-variable transmission include a primary pulley and a secondary pulley that is to receive the drive force transmitted from the input shaft through the primary pulley and the transmission belt, wherein the belt clamping force is increased, when the at least one first connecting/disconnecting device and the at least one second connecting/disconnecting device are controlled to connect the first drive-force transmitting path and to disconnect the second drive-force transmitting path, respectively, and at least one of a plurality of conditions is satisfied, and wherein the plurality of conditions include (i) a first condition that a rotational speed of a primary input shaft of the primary pulley is within a given speed range, (ii) a second condition that an opening degree of a throttle valve provided in the engine is not larger than a given value and (iii) a third condition that a temperature of a working fluid used in the vehicle driving apparatus is within a given temperature range.

In the control apparatus according to the first aspect of the invention, there are provided the first-operating-state determining portion and the belt-clamping-force controlling portion. The first-operating-state determining portion is configured to determine whether the vehicle driving apparatus is in the first operating state, by determining at least (i) whether the first drive-force transmitting path is established and (ii) whether there is the probability that noises are to be generated between the input shaft and the continuously-variable transmission, and is configured to determine that the vehicle driving apparatus is in the first operating state when determining at least that the first drive-force transmitting path is established and that there is the above-described probability. The belt-clamping-force controlling portion is configured to control the belt clamping force by which the transmission belt is clamped by each of at least one of the pulleys, and is configured, when it is determined by the first-operating-state determining portion that the vehicle driving apparatus is in the first operating state, to start execution of the belt-clamping-force increasing control for increasing the belt clamping force such that the belt clamping force is made larger when the vehicle driving apparatus is in the first operating state than when the vehicle driving apparatus is in an operating state that is different from the first operating state. Thus, the belt clamping force of the continuously-variable transmission is increased to be larger whereby a drag torque of the continuously-variable transmission is increased to be higher in the first operating state in which there is the probability of generation of the noises, than in an operating state that is different from the first operating state. Owing to this arrangement, it is possible to retrain generation of the rattle noises in a clearance around an axis in a spline connection located between the continuously-variable transmission and the input shaft through which the drive force is to be transmitted to the continuously-variable transmission. Further, the drive-force transmitting path can be switched from the first drive-force transmitting path to the second drive-force transmitting path, without causing control interference in the connecting/disconnecting device, so that the switching of the drive-force transmitting path can be made with a reduced engaging shock and without delay of the switching.

In the control apparatus according to the second aspect of the invention, there is further provided the second-operating-state determining portion configured to determine whether the vehicle driving apparatus is in a second operating state which is different from the first operating state and in which the first drive-force transmitting path is established. The belt-clamping-force controlling portion is configured, when it is determined by the second-operating-state determining portion that the vehicle driving apparatus is in the second operating state, to execute the belt-clamping-force reducing control for reducing the belt clamping force such that the belt clamping force is returned to an unincreased value that is a value before the execution of the belt-clamping-force increasing control. Thus, in the second operating state that is different from the first operating state in which it is determined that there is the probability of generation of the noises, the belt clamping force of the continuously-variable transmission is returned to the unincreased value that is the value before the execution of the belt-clamping-force increasing control, whereby a load of the drive force source is reduced so that an efficiency of energy utilization of the drive force source such as a fuel efficiency is improved.

In the control apparatus according to the third aspect of the invention, the belt-clamping-force controlling portion is configured to keep the execution of the belt-clamping-force increasing control, when the vehicle driving apparatus is placed in the third operating state that is different from the first and second operating states after it is determined by the first-operating-state determining portion that the vehicle driving apparatus is in the first operating state and before it is determined by the second-operating-state determining portion that the vehicle driving apparatus is in the second operating state. Owing to this arrangement, it is possible to avoid a situation in which the determination of the vehicle driving apparatus being in the first operating state and the determination of the vehicle driving apparatus being in the second operating state are frequently alternated to each other thereby causing frequent alternate execution of the belt-clamping-force increasing control and the belt-clamping-force reducing control.

In the control apparatus according to the fourth aspect of the invention, the belt-clamping-force increasing control is a control executed to increase the hydraulic pressure supplied to the hydraulic actuator of the secondary pulley that is configured to control the width of the V-shape groove of the second pulley. Owing to the control executed to increase the hydraulic pressure supplied to the hydraulic actuator of the secondary pulley, the belt clamping force is increased whereby the drag torque of the continuously-variable transmission is increased, so that the generation of the rattle noises in the clearance around the axis in the spline connection between the continuously-variable transmission and the input shaft can be retrained.

In the control apparatus according to the fifth aspect of the invention, the vehicle driving apparatus further includes an engine as a drive force source configured to generate the drive force, at least one first connecting/disconnecting device configured to selectively connect and disconnect the first drive-force transmitting path, and at least one second connecting/disconnecting device configured to selectively connect and disconnect the second drive-force transmitting path, wherein the pulleys of the continuously-variable transmission include a primary pulley and a secondary pulley that is to receive the drive force transmitted from the input shaft through the primary pulley and the transmission belt, wherein the belt clamping force is increased, when the at least one first connecting/disconnecting device and the at least one second connecting/disconnecting device are controlled to connect the first drive-force transmitting path and to disconnect the second drive-force transmitting path, respectively, and at least one of a plurality of conditions is satisfied, and wherein the plurality of conditions include (i) a first condition that a rotational speed of a primary input shaft of the primary pulley is within a given speed range, (ii) a second condition that an opening degree of a throttle valve provided in the engine is not larger than a given value and (iii) a third condition that a temperature of a working fluid used in the vehicle driving apparatus is within a given temperature range. Therefore, for example, with the given speed range, the given value and the given temperature range relating to the respective first, second and third conditions being pre-obtained through experimentation or design theory for each of various types of vehicles, these threshold values or ranges can be set suitably for each of the various types of vehicles, so that the generation of the rattle noises in the clearance around the axis in the spline connection between the continuously-variable transmission and the input shaft can be retrained.

DETAILED DESCRIPTION OF PREFERRED EMBODIMENT

Figure 1:
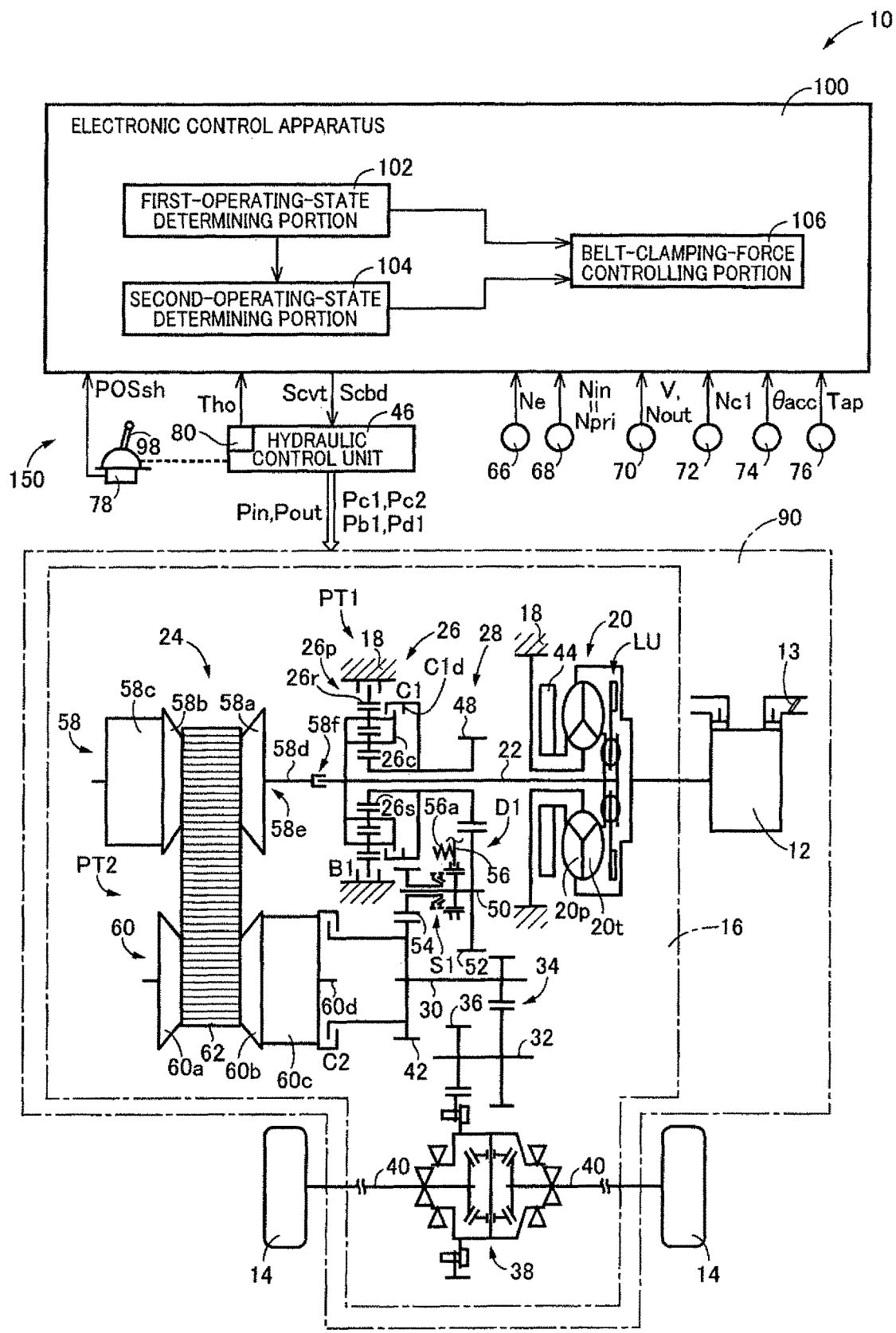
FIG. 1 is a schematic view showing a construction of a vehicle provided with a vehicle driving apparatus that is to be controlled by an electronic control apparatus according to an embodiment of the present invention, and major control functions and control portions of the electronic control apparatus.

Hereinafter, a preferred embodiment of the invention will be described in detail with reference to the accompanying drawings. FIG. 1 is a schematic view showing a construction of a vehicle 10 provided with a vehicle driving apparatus 90 that is to be controlled by an electronic control apparatus 100 according to the embodiment of the present invention, and major control functions and control portions of the electronic control apparatus 100.

The vehicle 10 includes drive wheels 14 and a hydraulic control unit 46 in addition to the vehicle driving apparatus 90 and the electronic control apparatus 100. The vehicle driving apparatus 90 includes an engine 12 serving as a drive force source configured to generate a drive force for driving the vehicle 10 and a drive force drive-force transmitting apparatus 16 configured to transmit the drive force generated by the engine 12, to the drive wheels 14.

The engine 12 is constituted by an internal combustion engine such as a gasoline engine and a diesel engine.

The drive-force transmitting apparatus 16 includes a non-rotary member in the form of a casing 18, a fluid-operated type drive-force transmitting device in the form of a torque converter 20, an input shaft 22, a belt-type continuously-variable transmission 24, a forward/reverse switching device 26, a gear mechanism 28, an output shaft 30, a counter shaft 32, a reduction gear device 34 consisting of a pair of mutually meshing gears each of which is connected to a corresponding one of the output shaft 30 and the counter shaft 32 so as to unrotatable relative to the corresponding one of the shafts 30, 32, a gear 36 connected to the counter shaft 32 so as to be unrotatable relative to the counter shaft 32, a differential gear device 38 connected to the gear 36, and axles 40.

The torque converter 20 is provided with a pump impeller 20p and a turbine impeller 20t and is configured to transmit the drive force through a fluid. The pump impeller 20p is connected to a crankshaft of the engine 12, while the turbine impeller 20t is connected to the forward/reverse switching device 26 through the input shaft 22 that corresponds to an output member of the torque converter 20. A lockup clutch LU is provided between the pump impeller 20p and the turbine impeller 20t, so that the pump impeller 20p and the turbine impeller 20t are rotated integrally with each other when the lockup clutch LU is fully engaged.

The drive force (torque) generated by the engine 12 is transmitted to the input shaft 22 through the torque converter 20. In the drive-force transmitting apparatus 16, a selected one of first and second drive-force transmitting paths PT1, PT2 is to be established between input and output shafts 22, 30. When the first drive-force transmitting path PT1 is established, the drive force is transmitted from the input shaft 22 to the output shaft 30 through the forward/reverse switching device 26 and the gear mechanism 28. When the second drive-force transmitting path PT2 is established, the drive force is transmitted from the input shaft 22 to the output shaft 30 through the continuously-variable transmission 24. A gear running mode is a running mode in which the first drive-force transmitting path PT1 is established whereby the drive force of the engine 12 is transmitted to the output shaft 30 through the gear mechanism 28. A belt running mode is a running mode in which the second drive-force transmitting path PT2 is established whereby the drive force of the engine 12 is transmitted to the output shaft 30 through the continuously-variable transmission 24. The drive force is transmitted from the output shaft 30 to the drive wheels 14 through the reduction gear device 34, the counter shaft 32, the gear 36, the differential gear device 38 and the axles 40. The drive-force transmitting apparatus 16 is provided with a forward running clutch C1, a belt running clutch C2, a reverse running brake B1 and a dog clutch D1, for establishing one of the first and second drive-force transmitting paths PT1, PT2, which is selected depending on a running state of the vehicle 10. Each of the forward running clutch C1, belt running clutch C2, reverse running brake B1 and dog clutch D1 corresponds to a connecting/disconnecting device that is configured to selectively connect and disconnect the first drive-force transmitting path PT1 or the second drive-force transmitting path PT2, and is constituted by a hydraulically-operated friction engagement device that is to be frictionally engaged by operation of a hydraulic actuator. It is noted that each of the forward running clutch C1, reverse running brake B1 and dog clutch D1 corresponds to "first connecting/disconnecting device" that is recited in the appended claims, and that the belt running clutch C2 corresponds to "second connecting/disconnecting device" that is recited in the appended claims.

The forward/reverse switching device 26 is constituted mainly by the above-described forward running clutch C1 and reverse running brake B1 and a planetary gear device 26p of single pinion type. The planetary gear device 26p includes a sun gear 26s, a carrier 26c and a ring gear 26r. The sun gear 26s is connected to a small-diameter gear 48 that constitutes a part of the gear mechanism 28. The carrier 26c is connected integrally with the input shaft 22. The ring gear 26r is selectively connected to the casing 18 as the non-rotary member through the reverse running brake B1. The sun gear 26s and the carrier 26c are selectively connected to each other through the forward running clutch C1.

The gear mechanism 28 includes the above-described small-diameter gear 48, a gear-mechanism counter shaft 50 and a large-diameter gear 52. The large-diameter gear 52 meshes with the small-diameter gear 48, and is mounted on the gear-mechanism counter shaft 50 so as to be coaxial with the gear-mechanism counter shaft 50 and unrotatable relative to the gear-mechanism counter shaft 50. The large-diameter gear 52 has a diameter larger than that of the small-diameter gear 48. The gear mechanism 28 further includes an idler gear 54 and an output gear 42. The idler gear 54 is mounted on the gear-mechanism counter shaft 50 so as to be coaxial with the gear-mechanism counter shaft 50 and rotatable relative to the gear-mechanism counter shaft 50. The output gear 42 meshes with the idler gear 54, and is mounted on the output shaft 30 so as to be coaxial with the output shaft 30 and unrotatable relative to the output shaft 30. The output gear 42 has a diameter larger than that of the idler gear 54.

The gear mechanism 28 further includes the above-described dog clutch D1 which is mounted on the gear-mechanism counter shaft 50 and which is disposed between the large-diameter gear 52 and the idler gear 54 so as to selectively connect and disconnect a part of the first drive-force transmitting path PT1, i.e., a drive-force transmitting path between the large-diameter gear 52 and the idler gear 54. The dog clutch D1 cooperates with one of the forward running clutch C1 and the reverse running brake B1 to establish the first drive-force transmitting path PT1. That is, the first drive-force transmitting path PT1 is established when the dog clutch D1 is engaged together with engagement of either one of the forward running clutch C1 and the reverse running brake B1. The first drive-force transmitting path PT1 is disconnected when both of the forward running clutch C1 and the reverse running brake B1 is released or when the dog clutch D1 is released. The dog clutch D1 is equipped with a known synchronous meshing mechanism S1 as a synchronization mechanism for synchronizing rotations of the large-diameter gear 52 and the idler gear 54 with each other upon engagement of the dog clutch D1. An operation state of the dog clutch D1 is switched by operation of a hydraulic actuator 56 that is included in the drive-force transmitting apparatus 16. The dog clutch D1 is equipped with a spring 56a that provides a biasing force forcing the dog clutch D1 to be released.

The gear mechanism 28 serves as a transmission having a single gear ratio in the first drive-force transmitting path PT1 that is established between the input and output shafts 22, 30. The gear ratio of the gear mechanism 28 provided between the input and output shafts 22, 30 corresponds to a gear ratio γgear (=input-shaft rotational speed Nin/output-shaft rotational speed Nout) during the gear running mode.

Between the continuously-variable transmission 24 and the output shaft 30, the belt running clutch C2 is interposed to selectively connect and disconnect between the continuously-variable transmission 24 and the output shaft 30. When the belt running clutch C2 is engaged, the drive force of the engine 12 is transmitted to the output shaft 30 through the input shaft 22 and the continuously-variable transmission 24. When the belt running clutch C2 is released, the drive force is not transmitted from the continuously-variable transmission 24 to the output shaft 30.

The continuously-variable transmission 24 includes an input-side member in the form of a primary pulley 58 that is disposed on a side of the input shaft 22, an output-side member in the form of a secondary pulley 60, and a transmission belt 62 looped over or mounted on the primary and secondary pulleys 58, 60. The continuously-variable transmission 24 transmits the drive force, owing to a friction force generated between the transmission belt 62 and each of the primary and secondary pulleys 58, 60. The friction force corresponds to a clamping force, and is referred also to as a belt clamping force. The belt clamping force Cp corresponds also to a torque capacity of the transmission belt 62 of the continuously-variable transmission 24.

In the continuously-variable transmission 24, each of the primary and second pulleys 58, 60 having a V-shaped groove whose width is variable. The width of the V-shaped groove of the primary pulley 58 and the width of the V-shaped groove of the secondary pulley 60 are controlled such that a tension of the transmission belt 62 is held substantially constant. With the width of the V-shaped groove of one of the primary and secondary pulleys 58, 60 being changed relative to that of the other of the primary and secondary pulleys 58, 60, namely, with a belt winding diameter (effective diameter) of one of the primary and secondary pulleys 58, 60 being changed relative to that of the other of the primary and secondary pulleys 58, 60, a gear ratio of the continuously-variable transmission 24 is changed. Hereinafter, the gear ratio of the continuously-variable transmission 24 (=input-shaft rotational speed Nin/output-shaft rotational speed Nout) will be referred to as a continuously-variable gear ratio γcvt. The continuously-variable gear ratio γcvt corresponds to a ratio of the effective diameter of the secondary pulley 60 to the effective diameter of the primary pulley 58. For example, when the V-shaped groove width of the primary pulley 58 and the V-shaped groove width of the secondary pulley 60 are reduced and increased, respectively, the continuously-variable gear ratio γcvt is reduced, namely, a shift-up action is executed in the continuously-variable transmission 24. When the V-shaped groove width of the primary pulley 58 and the V-shaped groove width of the secondary pulley 60 are increased and reduced, respectively, the continuously-variable gear ratio γcvt is increased, namely, a shift-down action is executed in the continuously-variable transmission 24. The continuously-variable gear ratio γcvt is continuously variable, namely, variable in a stepless manner, within a range between a minimum gear-ratio value γcvt min and a maximum gear-ratio value γcvt_max. The maximum gear-ratio value γcvt_max of the continuously-variable gear ratio γcvt is closer to a gear ratio γgear of the gear mechanism 28 than the minimum gear-ratio value γcvt min of the continuously-variable gear ratio γcvt, and is lower than the gear ratio γgear of the gear mechanism 28. Thus, when either one of the gear running mode and the belt running mode is switched to the other, the continuously-variable gear ratio γcvt of the continuously-variable transmission 24 is increased to the maximum gear-ratio value γcvt_max, so as to alleviate a shifting shock. That is, during the gear running mode, the continuously-variable gear ratio γcvt of the continuously-variable transmission 24 is set to a value close to the maximum gear-ratio value γcvt_max, in preparation of switching to the belt running mode.

The electronic control apparatus 100 includes a so-called microcomputer incorporating a CPU, a ROM, a RAM and an input-output interface, for example. The CPU performs control operations of the vehicle 10, by processing various input signals, according to control programs stored in the ROM, while utilizing a temporary data storage function of the RAM. The electronic control apparatus 100 is configured to perform, for example, a shifting control operation and a belt-clamping-force control operation for the continuously-variable transmission 24, and a hydraulic-pressure control operation for switching the operation state of each of the plurality of connecting/disconnecting devices (forward running clutch C1, reverse running brake B1, belt running clutch C2, dog clutch D1).

The electronic control apparatus 100 receives various input signals based on values detected by respective sensors provided in the vehicle 10. Specifically, the electronic control apparatus 100 receives: an output signal of an engine speed sensor 66 indicative of an engine rotational speed Ne (rpm) which is a rotational speed of the engine 12; an output signal of a primary-input-shaft speed sensor 68 indicative of a primary-input-shaft rotational speed Npri (rpm) which is equivalent to an input-shaft rotational speed Nin (rpm); an output signal of an output-shaft speed sensor 70 indicative of an output rotational speed Nout (rpm) which is a rotational speed of the output shaft 30 and which corresponds to the running speed V of the vehicle 10; an output signal of a C1-drum speed sensor 72 indicative of a C1-drum rotational speed Nc1 (*rpm*); an output signal of an accelerator-operation amount sensor 74 indicative of an accelerator operation amount θacc (%) which represents an amount of accelerating operation made by a vehicle operator; an output signal of a throttle-opening degree sensor 76 indicative of an opening degree tap (%) of a throttle valve 13 provided in the engine 12 (hereinafter simply referred to as a throttle opening degree tap); an output signal of a shift position sensor 78 indicative of an operation position POSsh of a manually-operated shifting member in the form of a shift lever 98 provided in the vehicle 10; and an output signal of a temperature sensor 80 indicative of a working fluid temperature Tho (° C.) that is a temperature of a working fluid used in the vehicle driving apparatus 90. The primary-input-shaft rotational speed Npri (rpm) is a rotational speed of the primary input shaft 58*d* through which the drive-force is to be transmitted to the primary pulley 58. The C1-drum rotational speed Nc1 is a rotational speed of a drum C1*d* of the forward running clutch C1 (that is one of the connecting/disconnecting devices), which is to be engaged with the carrier 26*c* of the planetary gear device 26*p*, and is equal to a rotational speed of the small-diameter gear 48 that is connected to the drum C1*d*.

The electronic control apparatus 100 generates various output signals which are supplied to various devices or units such as the hydraulic control unit 46 provided in the vehicle 10 and which include a hydraulic control command signal Scvt for performing hydraulic controls such as controls of the shifting action and the belt clamping force Cp of the continuously-variable transmission 24, and a hydraulic-control command signal Scbd for performing hydraulic controls such as controls of operation states of the plurality of connecting/disconnecting devices.

The shift lever 98 is operable to be placed in a selected one of a plurality of operation positions POSsh that consist of, for example, a parking position P, a reverse position R, a neutral position N and a drive position D. With the shift lever 98 being placed in the parking position P, the drive-force transmitting apparatus 16 is placed in its parking position in which the drive-force transmitting apparatus 16 is placed in its neutral state and rotation of the output shaft 30 is mechanically inhibited (locked). The drive-force transmitting apparatus 16 is placed in the neutral state, for example, by releasing all of the first clutch C1, first brake B1 and second clutch C2. That is, the neutral state is a state of the drive-force transmitting apparatus 16 in which neither the first drive-force transmitting path PT1 nor the second drive-force transmitting path PT2 is established. With the shift lever 98 being placed in the reverse position R, the drive-force transmitting apparatus 16 is placed in its reverse drive position for enabling the reverse running of the vehicle 10 in the gear running mode. With the shift lever 98 being placed in the neutral position N, the drive-force transmitting apparatus 16 is placed in its neutral position in which the drive-force transmitting apparatus 16 is placed in its neutral state. With the shift lever 98 being placed in the drive position D, the drive-force transmitting apparatus 16 is placed in its forward drive position for enabling the forward running of the vehicle 10 in the gear running mode, or enabling the forward running of the vehicle 10 in the belt running mode with execution of an automatic shifting control of the continuously-variable transmission 24.

In accordance with the hydraulic-control command signal Scbd supplied from the electronic control apparatus 100, the hydraulic control unit 46 supplies a C1 pressure Pc1 (MPa), a C2 pressure Pc2 (MPa), a B1 pressure Pb1 (MPa) and a D1 pressure Pd1 (MPa) to actuators of the respective forward running clutch C1, belt running clutch C2, reverse running brake B1 and dog clutch D1, so as to control operation states of the respective forward running clutch C1, belt running clutch C2, reverse running brake B1 and dog clutch D1. Further, in accordance with the hydraulic-control command signal Scvt supplied from the electronic control apparatus 100, the hydraulic control unit 46 supplies a primary pressure Pin (MPa) and a secondary pressure Pout (MPa) to a primary hydraulic actuator 58c and a secondary hydraulic actuator 60c, as described below.

The drive-force transmitting apparatus 16 is provided with a mechanical fluid pump (mechanical oil pump) 44 connected to the pump impeller 20p. The fluid pump 44 is to be driven by the engine 12, to supply a pressurized fluid in the form of a working fluid (lubricant fluid) to the hydraulic control unit 46, for performing a shifting control operation in the continuously-variable transmission 24, generating the belt clamping force Cp in the continuously-variable transmission 24, and switching the operation state of each of the above-described hydraulically-operated friction engagement devices between its engaged state and released state.

Figure 2:
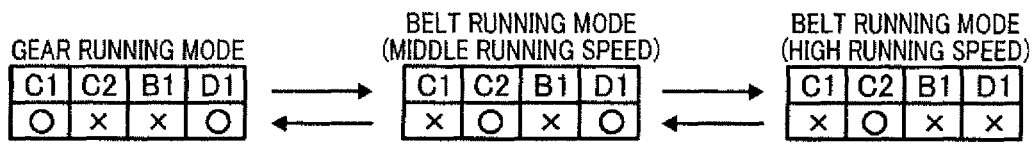
FIG. 2 is a view for explaining switching of an operating mode of the drive-force transmitting apparatus shown in FIG. 1.

FIG. 2 is a view for explaining switching of an operating mode of the drive-force transmitting apparatus 16 shown in FIG. 1. In FIG. 2, "C1" represents the forward running clutch C1, "C2" represents the belt running clutch C2", "B1" represents the reverse running brake B1, and "D1" represents the dog clutch D1. "o" represents the engaged state, i.e., the connecting state. "x" represents the released state, i.e., the disconnecting state. The dog clutch D1 is equipped with the synchronous meshing mechanism S1, which is to be operated when the dog clutch D1 is placed into its engaged state.

During a forward running of the vehicle 10 in the gear running mode in which the drive force of the engine 12 is transmitted to the output shaft 30 through the gear mechanism 28, the forward running clutch C1 and the dog clutch D1 are engaged while the belt running clutch C2 and the reverse running brake B1 are released.

During a high speed running of the vehicle 10 in the belt running mode in which the drive force of the engine 12 is transmitted to the output shaft 30 through the continuously-variable transmission 24, the belt running clutch C2 is engaged while the forward running clutch C1, reverse running brake B1 and dog clutch D1 are released. When the belt running mode is established in a high speed range, the dog clutch D1 is released, for example, for the purpose of avoiding drag of the gear mechanism 28 and other elements during running of the vehicle 10 in the belt running mode and preventing gears of the gear mechanism 28 and other elements from being rotated at high speeds.

When the running mode is switched from the gear running mode to the belt running mode (high running speed) or from the belt running mode (high running speed) to the gear running mode, the switching is made via the belt running mode (middle running speed). During a middle speed running of the vehicle 10 in the belt running mode, the belt running clutch C2 and the dog clutch D1 are engaged while the forward running clutch C1 and the reverse running brake B1 are released.

Figure 3:
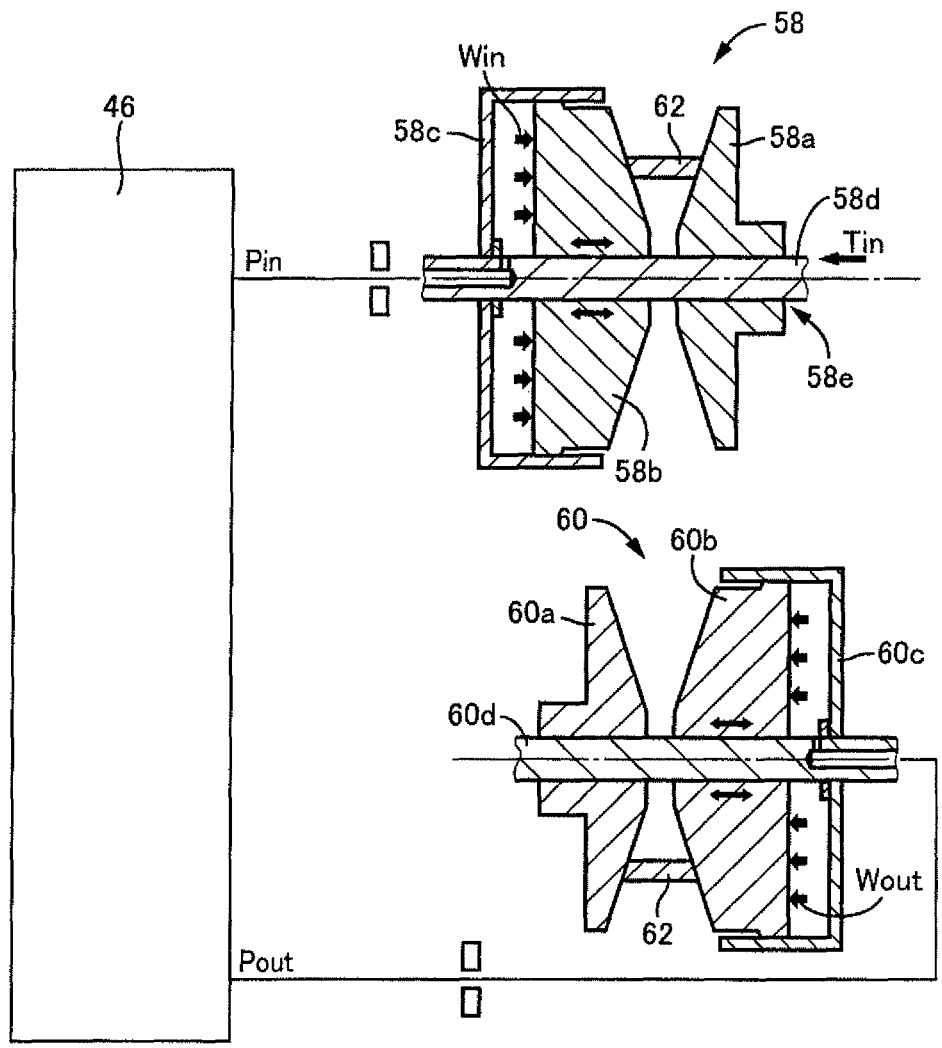
FIG. 3 is a hydraulic circuit diagram for explaining a main portion of a hydraulic control unit, which relates to a shifting control of a belt-type continuously-variable transmission.

FIG. 3 is a hydraulic circuit diagram for explaining a main portion of the hydraulic control unit 46, which relates to the shifting control of the belt-type continuously-variable transmission 24.

Hereinafter, the shifting control of the belt-type continuously-variable transmission 24 in the belt running mode will be described.

The primary pulley 58 includes a primary fixed sheave 58a, a primary movable sheave 58b, a primary hydraulic actuator 58c and a primary input shaft 58d. The primary fixed sheave 58a serves as an input-side fixed rotary body, and is fixedly mounted on the primary input shaft 58d that is splined to the input shaft 22, such that the primary fixed sheave 58a is coaxial with the primary input shaft 58d. The spline engagement or connection between the input shaft 22 and the primary input shaft 58d is an engagement or connection made by, for example, meshing of spline teeth of the input shaft 22 and spline teeth of the primary input shaft 58d. The primary movable sheave 58b serves as an input-side movable rotary body, and is mounted on the primary input shaft 58d, such that the primary movable sheave 58b is coaxial with the primary input shaft 58d, and is unrotatable relative to the primary fixed sheave 58a about its axis and axially movable relative to the primary fixed sheave 58a. The primary hydraulic actuator 58c applies a primary thrust Win (N) (=primary pressure Pin (MPa)*pressure receiving area (mm$^2$)) to the primary movable sheave 58b, so as to change the V-shaped groove width that is defined between the primary fixed sheave 58a and the primary movable sheave 58b. The primary thrust Win is a thrust which is given by the primary hydraulic actuator 58c and by which the transmission belt 62 is clamped by the primary pulley 58. The primary pressure Pin is a hydraulic pressure that is supplied from the hydraulic control unit 46 to the primary hydraulic actuator 58c, and is a pulley hydraulic pressure based on which the primary thrust Win is generated. The primary input shaft 58d applies a rotational force Tin (Nm) to the primary pulley 58.

The primary fixed sheave 58a and the primary input shaft 58d are splined to each other, namely, connected to each other through a spline connection, which may be made, for example, by a ball spline, a roller spline or a standard spline in which the spline teeth of the primary fixed sheave 58a and the spline teeth of the primary input shaft 58d mesh with each other. In the spline connection, there exists a clearance (play or backlash) 58e in the circumferential direction around the axis. Further, as described above, the input shaft 22 and the primary input shaft 58d are also connected to each other through a spline connection, and there exists a clearance (play or backlash) 58e (see FIG. 1) in the circumferential direction around the axis in this spline connection. Therefore, there is a case in which rattle noises are generated by collision of two elements in at least the clearance 58f of the clearances 58e, 58f in the respective two connections (that are located between the continuously-variable transmission 24 and the input shaft 22 through which the drive force is to be transmitted to the continuously-variable transmission 24), for example, due to torque fluctuation of the input shaft 22. Particularly, where the spline connection is constituted by the standard spline in which the spline teeth mesh with each other, the clearance in the spline connection is likely to be larger than where the spline connection is constituted by the ball spline or roller spline, so that the rattle noises are more likely to be generated by collision of the spline teeth.

The secondary pulley 60 includes a secondary fixed sheave 60a, a secondary movable sheave 60b, a secondary hydraulic actuator 60c and a secondary output shaft 60d. The secondary fixed sheave 60a serves as an output-side fixed rotary body, and is fixedly mounted on the secondary output shaft 60d, such that the secondary fixed sheave 60a is coaxial with the secondary output shaft 60d. The secondary movable sheave 60b serves as an output-side movable rotary body, and is mounted on the secondary output shaft 60d, such that the secondary movable sheave 60b is coaxial with the secondary output shaft 60d, and is unrotatable relative to the secondary fixed sheave 60a about its axis and axially movable relative to the secondary fixed sheave 60a. The secondary hydraulic actuator 60c applies a secondary thrust Wout (N) (secondary pressure Pout (MPa)*pressure receiving area (mm$^2$)) to the secondary movable sheave 60b, so as to change the V-shaped groove width that is defined between the secondary fixed sheave 60a and the secondary movable sheave 60b. The secondary thrust Wout is a thrust which is given by the secondary hydraulic actuator 60c and by which the transmission belt 62 is clamped by the secondary pulley 60. The secondary pressure Pout is a hydraulic pressure that is supplied from the hydraulic control unit 46 to the secondary hydraulic actuator 60c, and is a pulley hydraulic pressure based on which the secondary thrust Wout is generated.

In the continuously-variable transmission 24, the primary pressure Pin and the secondary pressure Pout, which are hydraulic pressures supplied from the hydraulic control unit 46, are regulated or controlled by the electronic control apparatus 100, whereby the primary thrust Win and the secondary thrust Wout are controlled. With the primary thrust Win and the secondary thrust Wout being changed, the V-shaped groove widths of the primary pulley 58 and the secondary pulley 60 are changed whereby the continuously-variable gear ratio γcvt is changed in the continuously-variable transmission 24. Further, in the continuously-variable transmission 24, the primary thrust Win and the secondary thrust Wout are controlled whereby the belt clamping force Cp is controlled such that the transmission belt 62 is not slipped.

As described above, the continuously-variable gear ratio γcvt corresponds to the ratio of the effective diameter of the secondary pulley 60 to the effective diameter of the primary pulley 58. For example, for avoiding slippage of the transmission belt 62 with the continuously-variable gear ratio γcvt being a given ratio value, the secondary pressure Pout is controlled in accordance with a predetermined relationship that assures a required and sufficient tension of the transmission belt 62, based on the throttle opening degree Tap and the continuously-variable gear ratio γcvt of the continuously-variable transmission 24. Further, the primary pressure Pin is controlled to establish a target ratio value as the continuously-variable gear ratio γcvt of the continuously-variable transmission 24. Where the secondary pressure Pout and the primary pressure Pin are controlled in accordance with the predetermine relationship that assures the required and sufficient tension of the transmission belt 62, the secondary pressure Pout and the primary pressure Pin are controlled to a standard pressure value Pout_std and a standard pressure value Pin_std, respectively, which are described below.

Hereinafter, the control of the V-shaped groove width of each of the primary and secondary pulleys 58, 60 of the continuously-variable transmission 24 in the gear running mode will be described.

In the gear running mode that is selected during running of the vehicle 10 in a low speed range, for example, when the vehicle 10 starts to run, the belt running clutch C2 is released so that the drive force is not transmitted between the secondary pulley 60 and the output shaft 30. Therefore, in the continuously-variable transmission 24, the second pressure Pout is set to a pressure value that avoids the transmission belt 62 from being slipped while the drive force of the engine 12 is not being transmitted through the continuously-variable transmission 24.

There will be described major control functions and control portions of the electronic control apparatus 100 which are involved in various control operations performed in the vehicle 10, with reference to FIG. 1. The electronic control apparatus 100 includes a first-operating-state determining portion 102, a second-operating-state determining portion 104 and a belt-clamping-force controlling portion 106.

The first-operating-state determining portion 102 is configured to determine whether the vehicle driving apparatus 90 is in a predetermined first operating state in which the first drive-force transmitting path PT1 is established and in which it is regarded or determined that there is a probability that the noises are to be generated. The "first operating state" is a predetermined operating state of the vehicle driving apparatus 90 in which it is determined that there is the probability of generation of the noises between the input shaft 22 and the continuously-variable transmission 24 in the gear running mode with the first drive-force transmitting path PT1 being established. Thus, the first-operating-state determining portion 102 determines whether the vehicle driving apparatus 90 is in the first operating state or not, by determining at least (i) whether the first drive-force transmitting path PT1 is established and (ii) whether there is the probability that noises are to be generated between the input shaft 22 and the continuously-variable transmission 24, and configured to determine that the vehicle driving apparatus 90 is in the first operating state when determining at least that the first drive-force transmitting path PT1 is established and that there is the above-described probability. A control-start requirement for starting a belt-clamping-force increasing control (that is described later) executed by the belt-clamping-force controlling portion 106 when it is determined that the vehicle driving apparatus 90 of the vehicle 10 is in the first operating state, consist of, for example, conditions (1a)-(8a) described below. In the present embodiment, the control-start requirement is satisfied when all of the below-described conditions (1a)-(8a) are satisfied. The condition (1a) is that the gear running mode for the forward running is established with the first drive-force transmitting path PT1 being established by engagements of the forward running clutch C1 and dog clutch D1 and releases of the belt running clutch C2 and the reverse running brake B1. The condition (2a) is that the C1-drum rotational speed Nc1 (*rpm*) corresponding to the primary input-shaft rotational speed Npri (rpm) is in a given speed range (e.g., range between Nc1_L and Nc1_H). The condition (3a) is that a C1 engagement inhibiting flag is OFF. The condition (4a) is that the engine rotational speed Ne (rpm) is kept not lower than a given speed value Ne_j (rpm) for at least a given length Tj (s) of time. The condition (5a) is that the continuously-variable gear ratio γcvt is not lower than a given ratio value γj. The condition (6a) is that the throttle opening degree Tap (%) is not larger than a given degree value Tap_j (%). The condition (7a) is that the working fluid temperature Tho (° C.) is within a given temperature range (e.g., range between Tho_L (° C.) and Tho_H (° C.)). The condition (8a) is that a CVT failure state flag is OFF.

The above-described conditions (1a)-(8a) are categorized mainly into two kinds of conditions that are noise generation conditions and control-execution withholding conditions. The noise generation conditions, each of which is based on the state of the vehicle driving apparatus 90 with the probability of generation of the noises, correspond to the above-described conditions (1a), (2a), (6a) and (7a). The control-execution withholding conditions, each of which is based on the state of the vehicle driving apparatus 90 with inconvenience or risk of execution of the control for mainly restraining the generation of the noises (e.g., control for increasing the secondary pressure Pout), correspond to the above-described conditions (3a), (4a), (5a) and (8a). The reasons why the satisfactions of all of the above-described conditions (1a)-(8a) are required for determination that the vehicle driving apparatus 90 is in the first operating state in which there is a probability of generation of the noises in the gear running mode, are described below.

The above-described condition (1a) is a condition that is to be satisfied in a case in which the connecting/disconnecting devices such as the forward running clutch C1, belt running clutch C2, reverse running brake B1 and dog clutch D1 are placed in respective operation states for establishing the gear running mode, which is a running mode with the first drive-force transmitting path PT1 being established, namely, with the drive force of the engine 12 being transmitted to the output shaft 30 through the gear mechanism 28. When the vehicle 10 is not in the gear running mode, there is no probability of generation of the noises between the input shaft 22 and the continuously-variable transmission 24, which is the issue to be resolved by the present invention. For example, in the belt running mode, the drive force of the engine 12 is transmitted to the drive wheels 14 via the primary pulley 58, transmission belt 62 and secondary pulley 60. Thus, in the clearance 58$e$ around the axis in the spline connection between the primary input shaft 58$d$ and the primary pulley 58, the spline teeth of the primary input shaft 58$d$ keeps forcing the spine teeth of the primary fixed sheave 58$a$ in a direction of rotation of the primary input shaft 58$d$. Further, in the clearance 58$f$ around the axis in the spline connection between the input shaft 22 and the primary input shaft 58$d$, too, the spline teeth of the input shaft 22 keeps forcing the spine teeth of the primary input shaft 58$d$ in a direction of rotation of the input shaft 22. Therefore, in the belt running mode, the rattle noises are not generated in the clearances 58$e$, 58$f$ around the axis in the two spline connections located between the input shaft 22 and the continuously-variable transmission 24.

The above-described condition (2a) is a condition that is to be satisfied in a case in which the C1-drum rotational speed Nc1 corresponding to the primary input-shaft rotational speed Npri is within a given speed range. During a forward running of the vehicle 10 in the gear running mode, the forward running clutch C1 is engaged whereby the C1-drum rotational speed Nc1 is connected to the input shaft 22 and the primary input shaft 58$d$ through the carrier 26$c$, so that the C1-drum rotational speed Nc1 is equal to the primary input-shaft rotational speed Npri. The reason why this condition (2a) is one of the conditions to be satisfied to satisfy the control-start requirement, is that the rattle noises are generated in at least the clearance 58$f$ of the clearances 58$e$, 58$f$ around the axis in the respective two connections that are located between the input shaft 22 and the continuously-variable transmission 24 when the C1-drum rotational speed Nc1 corresponding to the primary input-shaft rotational speed Npri is within the given speed range (not lower than Nc1_L and not higher than Nc1_H) with the drag torque Tt of the continuously-variable transmission 24 being a standard torque value Tt_std (without execution of the belt-clamping-force increasing control). The given speed range of the C1-drum rotational speed Nc1 is set to a range in which the rattle noises are likely to be generated and which can be pre-obtained through experimentation or design theory.

The above-described condition (3a) is a condition that is to be satisfied in a case in which the C1 engagement inhibiting flag is OFF. When the C1 engagement inhibiting flag is ON, the forward running clutch C1 is inhibited from being engaged so that the gear running mode is not established. Thus, there is no probability of generation of the rattle noises in the clearances 58$e$, 58$f$ around the axis in the two spline connections located between the input shaft 22 and the continuously-variable transmission 24.

The above-described condition (4a) is a condition that is be satisfied in a case in which the engine rotational speed Ne is kept not lower than the given speed value Ne_j for at least the given length Tj of time. This condition (4a) is provided for refraining from increasing the drag torque Tt of the continuously-variable transmission 24 above the standard torque value Tt_std shortly after start of the engine 12 from a state in which the vehicle 10 is stopped with the engine 12 being stopped. For example, the given speed value Ne_j is set to a value slightly lower than an idling speed, for detecting that the vehicle 10 is in its idling state. The given length Tj of time is set to a length value which is enough to determine completion of a warming-up drive and which can be pre-obtained through experimentation or deign theory.

The above-described condition (5a) is a condition that is to be satisfied in a case in which the continuously-variable gear ratio γcvt is not lower than the given ratio value γj. This condition (5a) is provided for reducing the drag torque Tt of the continuously-variable transmission 24 as quickly as possible so as to return the continuously-variable gear ratio γcvt of the continuously-variable transmission 24 to a value close to the maximum gear-ratio value γcvt_max in case of the gear running mode. For example, the given ratio value γj is set to a value slightly lower than the maximum gear-ratio value γcvt_max, for detecting a belt return failure.

The above-described condition (6a) is a condition that is to be satisfied in a case in which the throttle opening degree Tap is not larger than the given degree value Tap_j. This condition (6a) is provided for increasing the drag torque Tt of the continuously-variable transmission 24 above standard torque value Tt_std, exclusively when an accelerator pedal is not depressed largely, namely, when the vehicle operator is sensitive to the noises.

The above-described condition (7a) is a condition that is to be satisfied in a case in which the working fluid temperature Tho is within the given temperature range (e.g., not lower than Tho_L and not higher than Tho_H). When the working fluid temperature Tho is lower than Tho_L, the working fluid has a high viscosity so that the rattle noises are unlikely to be generated in the clearances 58$e$, 58$f$ around the axis in the two spline connections located between the input shaft 22 and the continuously-variable transmission 24. When the working fluid temperature Tho is higher than Tho_H, each of the clearances 58$e$, 58$f$ is reduced so that the rattle noises are unlikely to be generated in the clearances 58$e$, 58$f$ around the axis in the two spline connections located between the input shaft 22 and the continuously-variable transmission 24. The given temperature range is set to a range in which the rattle noises are likely to be generated and which can be pre-obtained through experimentation or deign theory.

The above-described condition (8a) is a condition that is to be satisfied in a case in which the CVT failure state flag is OFF. When the CVT failure state flag is ON, it is considered that a certain failure occurs in the continuously-variable transmission 24. When a certain failure occurs in the continuously-variable transmission 24, the belt clamping force Cp is not increased so that it is possible to avoid inconvenience caused by increase of the belt clamping force Cp. When the CVT failure state flag is OFF, namely, when there is no inconvenience caused by increase of the belt clamping force Cp, the belt clamping force Cp can be increased.

When it is determined by the first-operating-state determining portion 102 that the vehicle driving apparatus 90 is in the first operating state, the belt-clamping-force controlling portion 106 executes the belt-clamping-force increasing control for increasing the belt clamping force Cp such that the belt clamping force Cp is made larger than when the vehicle driving apparatus 90 in a second operating state that is different from or other than the first operating state. Specifically, the belt-clamping-force controlling portion 106 supplies, to the hydraulic control unit 46, the hydraulic-control command signal Scvt that requests increase the secondary pressure Pout to an increased pressure value Pout_hi (MPa) that is higher than the standard pressure value Pout_std (i.e., pressure value without execution of the belt-clamping-force increasing control). In accordance with the hydraulic-control command signal Scv, the hydraulic control unit 46 supplies, to the secondary hydraulic actuator 60c of the secondary pulley 60, the secondary pressure Pout in the form of the working fluid of the increased pressure value Pout_hi. An increased value of the belt clamping force Cp based on the increased pressure value Pout_hi and the increased pressure value Pin_hi is set to a value that avoids the noises from being generated when the vehicle driving apparatus 90 is in the first operating state and which can be pre-obtained through experimentation or deign theory.

When it is determined by the first-operating-state determining portion 102 that the vehicle 10 is not in the first operating state, the belt-clamping-force controlling portion 106 makes the secondary pressure Pout unchanged from the standard pressure value Pout_std so as to make the belt clamping force Cp unchanged from a value in the second operating state.

The second-operating-state determining portion 104 is configured to determine whether the vehicle driving apparatus 90 is in the predetermined second operating state in which the first drive-force transmitting path PT1 is established and which is different from or other than the first operating state. The "second operating state" is a predetermined operating state of the vehicle driving apparatus 90 in which it is determined that there is no probability of generation of the noises between the input shaft 22 and the continuously-variable transmission 24 in the gear running mode with the first drive-force transmitting path PT1 being established. A control-termination requirement for starting a belt-clamping-force reducing control (that is described later) executed by the belt-clamping-force controlling portion 106 when it is determined that the vehicle driving apparatus 90 of the vehicle 10 is in the second operating state, consist of, for example, conditions (1b)-(8b) described below, wherein the control-termination requirement is satisfied by satisfaction of any one of these conditions (1b)-(8b). The condition (1b) is that the engagement devices are controlled, such that the belt running clutch C2 is engaged while the forward running clutch C1, reverse running brake B1 and dog clutch D1 are released, or such that the forward running clutch C1, belt running clutch C2, reverse running brake B1 and dog clutch D1 are released, whereby the first drive-force transmitting path PT1 is not established so that the gear running mode is not established. The condition (2b) is that the C1-drum rotational speed Nc1 (rpm) corresponding to the primary input-shaft rotational speed Npri (rpm) is outside the given speed range (e.g., lower than Nc1_L or higher than Nc1_H). The condition (3b) is that the C1 engagement inhibiting flag is ON. The condition (4b) is that the engine rotational speed Ne (rpm) is lower than the given speed value Ne_j or is kept not lower than the given speed value Ne_j for less than the given length Tj of time. The condition (5b) is that the continuously-variable gear ratio γcvt is lower than the given ratio value γj. The condition (6b) is that the throttle opening degree Tap (%) is larger than the given degree value Tap_j (%). The condition (7b) is that the working fluid temperature Tho (° C.) is outside the given temperature range (e.g., lower than Tho_L (° C.) or higher than Tho_H (° C.)). The condition (8b) is that the CVT failure state flag is ON. It is noted that the second operating state of the vehicle driving apparatus 90 corresponds to "an operating state that is different from said first operating state" recited in the appended claims.

The conditions (1b)-(8b) constituting the control-termination requirement for terminating the belt-clamping-force increasing control are opposite to the respective conditions (1a)-(8a) constituting the control-start requirement for starting the belt-clamping-force increasing control. This means that it is determined that there is no probability of generation of the noises between the input shaft 22 and the continuously-variable transmission 24 when at least one of the conditions (1b)-(8b) is satisfied. As described above, it is determined that there is the probability of generation of the noises between the input shaft 22 and the continuously-variable transmission 24 when all of the conditions (1a)-(8a) are satisfied.

When it is determined by the second-operating-state determining portion 104 that the vehicle driving apparatus 90 of the vehicle 10 is in the second operating state, the belt-clamping-force controlling portion 106 executes the belt-clamping-force reducing control for returning the belt clamping force Cp to a force value in the second operating state. Specifically, the belt-clamping-force controlling portion 106 supplies, to the hydraulic control unit 46, the hydraulic-control command signal Scvt that requests reduction of the secondary pressure Pout from the increased pressure value Pout_hi to the standard pressure value Pout_std. In accordance with the hydraulic-control command signal Scv, the hydraulic control unit 46 supplies, to the secondary hydraulic actuator 60c of the secondary pulley 60, the secondary pressure Pout in the form of the working fluid of the standard pressure value Pout_std.

When it is determined by the second-operating-state determining portion 104 that the vehicle driving apparatus 90 of the vehicle 10 is not in the second operating state, the second-operating-state determining portion 104 determines again whether the vehicle driving apparatus 90 is in the second operating state.

Figure 4:
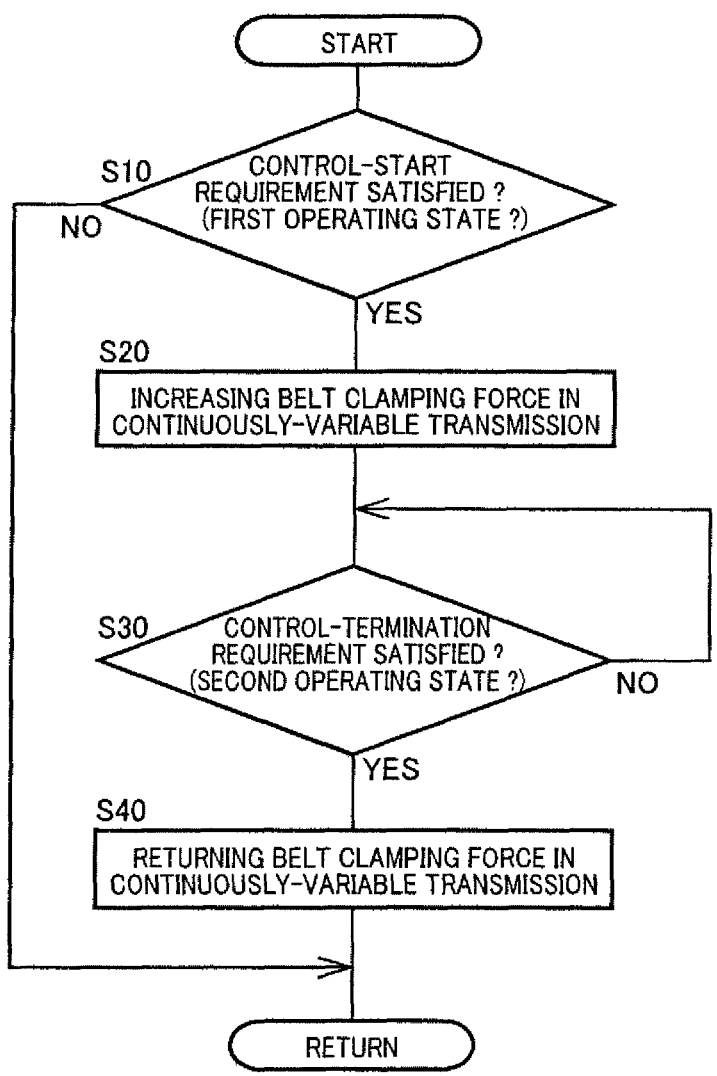
FIG. 4 is a flow chart showing a control routine, which is executed by the electronic control apparatus shown in FIG. 1, to control supply of a secondary pressure and a primary pressure, for changing a drag torque of the belt-type continuously-variable transmission.

FIG. 4 is a flow chart showing a control routine, which is executed by the electronic control apparatus 100 shown in FIG. 1, to control supply of the secondary pressure Put and the primary pressure Pin, for changing the drag torque Tt of the belt-type continuously-variable transmission 24. This control routine is executed, for example, in a repeated manner.

The control routine is initiated with step S10 corresponding to function of the first-operating-state determining portion 102, which is implemented to determine whether vehicle driving apparatus 90 of the vehicle 10 is in the first operating state. This determination is made depending on whether the above-described control-start requirement is satisfied or not. When an affirmative determination is made at step S10, step 20 is implemented. When a negative determination is made at step S10, one cycle of execution of the control routine is completed.

At step S20 corresponding to function of the belt-clamping-force controlling portion 106, a command pressure value of the secondary pressure Pou is set, by the belt-clamping-force controlling portion 106, to the increased pressure value Pout_hi that is higher than the standard pressure value Pout_std, whereby the belt clamping force Cp is increased to a clamping force value higher than a clamping force value that is a value when the vehicle driving apparatus 90 is in the second operating state, so that the drag torque Tt of the continuously-variable transmission 24 is increased to a torque value higher than a torque value that is a value when the vehicle driving apparatus 90 is in the second operating state.

Step S20 is followed by step S30 corresponding to function of the second-operating-state determining portion 104, which is implemented to determine whether the vehicle driving apparatus 90 of the vehicle 10 is in the second operating state. Specifically, this determination is made depending on whether the above-described control-termination requirement is satisfied or not. When an affirmative determination is made at step S30, step S40 is implemented. When a negative determination is made at step S30, step S30 is implemented again.

At step S40 corresponding to function of the belt-clamping-force controlling portion 106, the command pressure value of the secondary pressure Pout is retuned, by the belt-clamping-force controlling portion 106, from the increased pressure value Pout_hi to the standard pressure value Pout_std, whereby the belt clamping force Cp is made lower than a belt clamping force that is a value when the vehicle driving apparatus 90 is in the first operating state, so that the drag torque Tt of the continuously-variable transmission 24 is reduced to a torque value lower than a torque value that is a value when the vehicle driving apparatus 90 is in the first operating state. When step S40 has been implemented, one cycle of execution of the control routine is completed.

Figure 5:
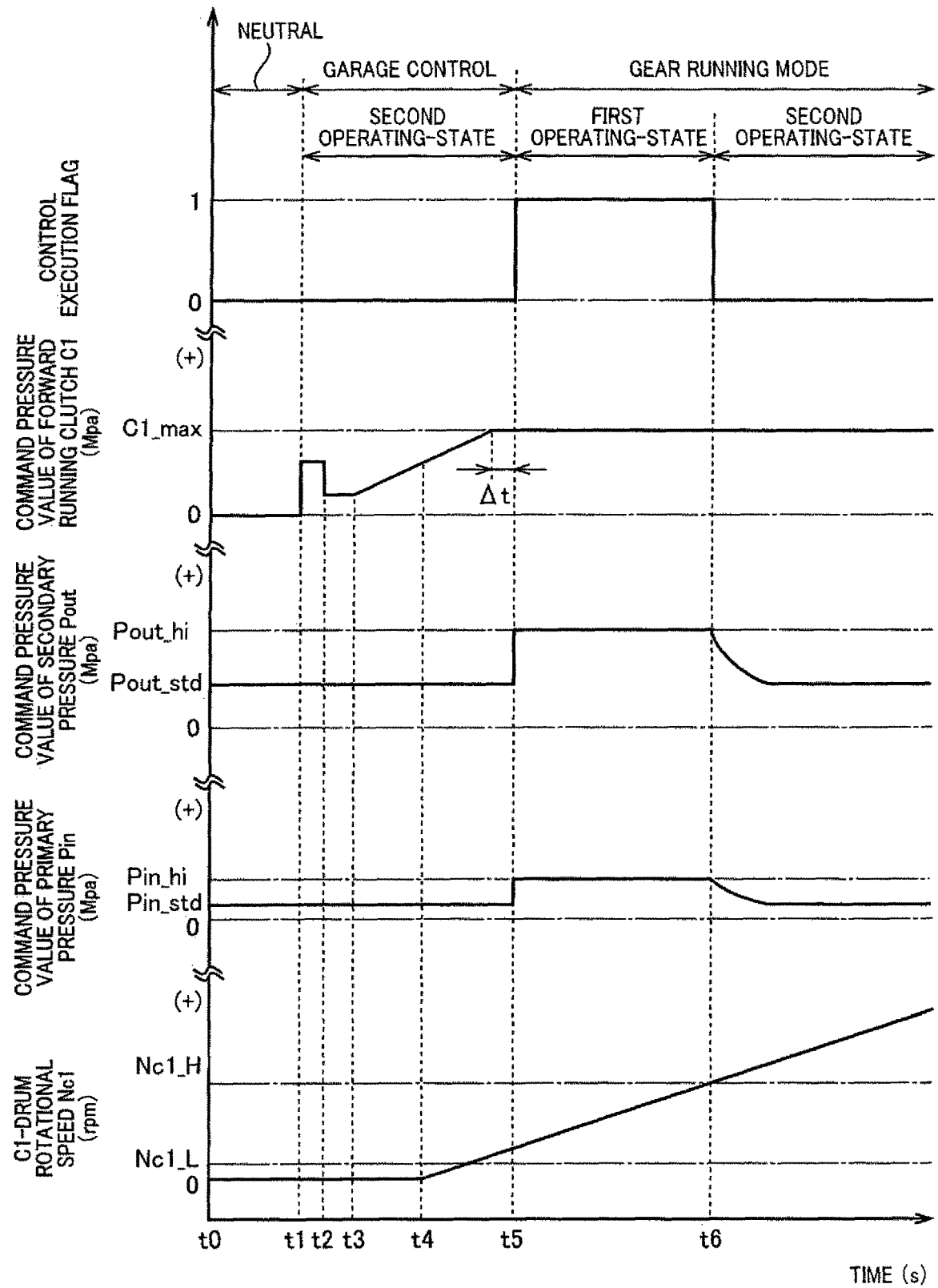
FIG. 5 is a time chart showing a control operation according to the embodiment of the invention, which is executed by the electronic control apparatus shown in FIG. 1, for controlling supply of the secondary pressure and the primary pressure, so as to restrain generation of noises between the belt-type continuously-variable transmission and an input shaft of the drive-force transmitting apparatus.

FIG. 5 is a time chart showing a control operation according to the embodiment of the invention, which is executed by the electronic control apparatus 100 shown in FIG. 1, for controlling supply of the secondary pressure Pout and the primary pressure Pin, so as to restrain generation of the noises between the input shaft 22 and the continuously-variable transmission 24.

In a stage from a point t0 of time to a point t1 of time, the shift lever 98 of the vehicle 10 is placed in the neutral position N as one of the operation positions POSsh. The command pressure value of the forward running clutch C1 is set to 0 (MPa) so that the forward running clutch C1 is placed in its released state. The command pressure value of the secondary pressure Pout is set to the standard pressure value Pout_std, while the command pressure value of the primary pressure Pin is set to the standard pressure value Pin_std. A control execution flag is set to "1" when the control-start requirement is satisfied, namely, when it is determined that the vehicle driving apparatus 90 of the vehicle 10 is in the first operating state, and is set to "0" when the control-termination requirement is satisfied, namely, when it is determined that the vehicle driving apparatus 90 of the vehicle 10 is in the second operating state. In the stage from the point t0 of time to the point of t1 of time, the vehicle 10 is in its neutral state rather than the gear running mode so that the control execution flag is "0".

At the point t1 of time, the shift lever 98 of the vehicle 10 is placed from the neutral position N to, for example, the drive position D as another one of the operation positions POSsh. By this placement of the shift lever 98, a so-called "garage control" is initiated in the vehicle driving apparatus 90 of the vehicle 10. The garage control is a control executed to switch the forward running clutch C1 from the released state to the engaged state, for example, in response to the switching from the neutral position N to the drive position D. Further, at the point t1 of time, the command pressure value of the forward running clutch C1 is increased to initiate an engaging contact of input and output elements of the forward running clutch C1 with each other. The command pressure value of the forward running clutch C1 is temporarily reduced at a point t2 of time, and is then gradually increased again from a point t3 of time. At a point t4 of time at which the command pressure value of the forward running clutch C1 reaches a given pressure value, the forward running clutch C1 starts to be engaged whereby the drive force of the engine 12 starts to be transmitted to the drum C1$d$ through the input shaft 22 and the forward running clutch C1, so that the C1-drum rotational speed Nc1 starts to be gradually increased at the point t4 of time.

The command pressure value of the forward running clutch C1 is increased also after the point t4 of time, but is controlled such that the command pressure value does not exceed a maximum pressure value C1 max. After the point t4 of time, the C1-drum rotational speed Nc1 is gradually increased. The garage control is terminated at a point t5 of time when a length Δt(s) of time elapses after the command pressure value of the forward running clutch C1 reaches the maximum pressure value C1 max. Although the C1-drum rotational speed Nc1 is made higher than the lower limit value Nc1_L of the given speed range in which there is the probability of generation of the noises in the stage between the point t4 of time and the point t5 of time, the control-start requirement is not satisfied in that stage in which the gear running mode is not yet established. At a point t5 of time, the vehicle driving apparatus 90 is switched from the garage control to the gear running mode, with the C1-drum rotational speed Nc1 being within the given speed range in which there is the probability of generation of the noises. Thus, at the point t5 of time, the control-start requirement is satisfied and the control execution flag is changed from "0" to "1". At a point t6 of time, the C1-drum rotational speed Nc1 exceeds the upper limit value Nc1_H of the given speed range in which there is the probability of generation of the noises. Thus, at the point t6 of time, the control-termination requirement is satisfied and the control execution flag is changed from "1" to "0".

At the point t5 of time at which the control execution flag is changed to "1" from "0", the belt-clamping-force increasing control is started whereby the command pressure value of the secondary pressure Pout is set to the increased pressure value Pout_hi that is higher than the standard pressure value Pout_std and the command pressure value of the primary pressure Pin is set to the increased pressure value Pin_hi that is higher than the standard pressure value Pin_std. In this instance, the increased pressure value Pin_hi is set to be lower than a maximum guard pressure value that is determined to avoid the continuously-variable gear ratio γcvt of the continuously-variable transmission 24 from being reduced too much away from the maximum gear-ratio value γcvt_max, namely, to avoid the continuously-variable transmission 24 is shifted up too much. With both of the command pressure value of the secondary pressure Pout and the command pressure value of the primary pressure Pin being increased, the belt clamping force Cp is increased and the drag torque Tt of the continuously-variable transmission 24 is increased. Thus, when it is determined that there is the probability that the rattle noises are to be generated in the clearances 58e, 58f around the axis in the two spline connections located between the between the input shaft 22 and the continuously-variable transmission 24 in the axial direction, the generation of the rattle noises is retrained with the drag torque Tt being controlled to be increased.

After a point t6 of time, the C1-drum rotational speed Nc1 is no longer within the given speed range in which there is the probability of generation of the rattle noises. At the point t6 of time, when the control execution flag is changed to "0" from "1", the belt-clamping-force reducing control is started whereby the command pressure value of the secondary pressure Pout is returned from the increased pressure value Pout_hi to the standard pressure value Pout_std and the command pressure value of the primary pressure Pin is returned from the increased pressure value Pin_hi to the standard pressure value Pin_std. With both of the command pressure value of the secondary pressure Pout and the command pressure value of the primary pressure Pin being reduced, the belt clamping force Cp is reduced whereby the drag torque Tt of the continuously-variable transmission 24 is reduced. Thus, when it is determined that there is no probability of generation of the rattle noises in the clearances 58e, 58f around the axis in the two spline connections located between the between the input shaft 22 and the continuously-variable transmission 24 in the axial direction, the drag torque Tt is controlled to be reduced. With the command pressure value of the secondary pressure Pout and the command pressure value of the primary pressure Pin being reduced, the drag torque Tt of the continuously-variable transmission 24 is reduced whereby a load of the engine 12 is reduced so that an efficiency of energy utilization of the drive force source such as a fuel efficiency of the engine 12 is improved.

In the electronic control apparatus 100 for the vehicle driving apparatus 90 according to the present embodiment, there are provided the first-operating-state determining portion 102 and the belt-clamping-force controlling portion 106. The first-operating-state determining portion 102 is configured to determine whether the vehicle driving apparatus 90 is in the first operating state, by determining at least (i) whether the first drive-force transmitting path PT1 is established and (ii) whether there is the probability that noises are to be generated between the input shaft 22 and the continuously-variable transmission 24, and is configured to determine that the vehicle driving apparatus 90 is in the first operating state when determining at least that the first drive-force transmitting path PT1 is established and that there is the above-described probability. The belt-clamping-force controlling portion 106 is configured to control the belt clamping force Cp by which the transmission belt 62 is clamped by each of at least one of the pulleys 68, 60, and is configured, when it is determined by the first-operating-state determining portion 102 that the vehicle driving apparatus 90 is in the first operating state, to start execution of the belt-clamping-force increasing control for increasing the belt clamping force Cp such that the belt clamping force Cp is made larger when the vehicle driving apparatus 90 is in the first operating state than when the vehicle driving apparatus 90 is in an operating state that is different from the first operating state. Thus, the belt clamping force Cp of the continuously-variable transmission 24 is increased to be larger whereby the drag torque Tt of the continuously-variable transmission 24 is increased to be higher in the first operating state in which there is the probability of generation of the noises. Owing to this arrangement, it is possible to retrain generation of the rattle noises in at least the clearance 58f of the clearances 58e, 58f in the respective two connections located between the continuously-variable transmission 24 and the input shaft 22 through which the drive force is to be transmitted to the continuously-variable transmission 24. Further, the drive-force transmitting path can be switched from the first drive-force transmitting path PT1 to the second drive-force transmitting path PT2, by simply a releasing action of the forward running clutch C1 and an engaging action of the belt running clutch C2 that are executed by a so-called "clutch-to-clutch shifting", namely, executed in an overlapped manner. Thus, the switching of the drive-force transmitting path can be made without control interference in the connecting/disconnecting devices, with a reduced engaging shock in the connecting/disconnecting devices and without delay of the switching.

In the electronic control apparatus 100 for the vehicle driving apparatus 90 according to the present embodiment, there is further provided the second-operating-state determining portion 104 configured to determine whether the vehicle driving apparatus 90 is in the second operating state which is different from the first operating state and in which the first drive-force transmitting path PT1 is established. The belt-clamping-force controlling portion 106 is configured, when it is determined by the second-operating-state determining portion 104 that the vehicle driving apparatus 90 is in the second operating state, to execute the belt-clamping-force reducing control for reducing the belt clamping force Cp such that the belt clamping force Cp is returned to an unincreased value that is a value before the execution of the belt-clamping-force increasing control. Thus, in the second operating state that is different from the first operating state in which it is determined that there is the probability of generation of the noises, the belt clamping force Cp of the continuously-variable transmission 24 is returned to the unincreased value that is the value before the execution of the belt-clamping-force increasing control, whereby a load applied to the engine 12 through the primary pulley 58 is reduced so that an efficiency of energy utilization of the drive force source such as a fuel efficiency is improved.

In the electronic control apparatus 100 for the vehicle driving apparatus 90 according to the present embodiment, the belt-clamping-force increasing control is a control executed to increase the secondary pressure Pout for controlling the V-shaped groove width of the secondary pulley 60 of the continuously-variable transmission 24. Owing to the control executed to increase the secondary pressure Pout, the belt clamping force Cp of the transmission belt 62 is increased whereby the drag torque Tt of the continuously-variable transmission 24 is increased, so that the generation of the rattle noises in at least the clearance 58f of the clearances 58e, 58f around the axis in the respective two spline connections between the continuously-variable transmission 24 and the input shaft 22 can be retrained.

In the electronic control apparatus 100 for the vehicle driving apparatus 90 according to the present embodiment, the vehicle driving apparatus 90 further includes the engine 10 as the drive force source configured to generate the drive force, at least one first connecting/disconnecting device in the form of the first brake B1, first clutch C1 and dog clutch D1 configured to selectively connect and disconnect the first drive-force transmitting path PT1, and at least one second connecting/disconnecting device in the form of the second clutch C2 configured to selectively connect and disconnect the second drive-force transmitting path PT2, wherein the pulleys of the continuously-variable transmission 24 include the primary pulley 58 and the secondary pulley 60 that is to receive the drive force transmitted from the input shaft 22 through the primary pulley 58 and the transmission belt 62. The belt clamping force Cp is increased when all of conditions are satisfied, wherein the conditions consist of: the condition (1) is that the gear running mode for the forward running is established with the first drive-force transmitting path PT1 being established by engagements of the forward running clutch C1 and dog clutch D1 and releases of the belt running clutch C2 and the reverse running brake B1; the condition (2) is that the C1-drum rotational speed Nc1 corresponding to the primary input-shaft rotational speed Npri of the primary pulley 58 of the continuously-variable transmission 24 is in the given speed range (range between Nc1_L and Nc1_H); the condition (3) is that the C1 engagement inhibiting flag is OFF; the condition (4) is that the engine rotational speed Ne (rpm) is kept not lower than the given speed value Ne_j (rpm) for at least the given length Tj (s) of time; the condition (5) is that the continuously-variable gear ratio γcvt is not lower than the given ratio value γj; the condition (6) is that the throttle opening degree Tap (%) is not larger than the given degree value Tap_j (%); the condition (7) is that the working fluid temperature Tho (° C.) is within the given temperature range (range between Tho_L (° C.) and Tho_H (° C.)); and the condition (8) is that the CVT failure state flag is OFF. Therefore, with the given ranges and values relating to the above-described conditions being pre-obtained through experimentation or design theory for each of various types of vehicles, these threshold values or ranges can be set suitably for each of the various types of vehicles, so that the generation of the rattle noises in the clearance around the axis in the spline connections between the continuously-variable transmission 24 and the input shaft 22 can be retrained.

While the preferred embodiment of this invention has been described in detail by reference to the drawings, it is to be understood that the invention may be otherwise embodied.

In the above description of the embodiment, it is described that the generation of the rattle noises in the clearances around the axis in the two spline connections between the continuously-variable transmission 24 and the input shaft 22 (through which the drive force is transmitted to the continuously-variable transmission 24) is restrained. However, the generation of the rattle noises in the clearances around the axis in the two spline connections between the continuously-variable transmission 24 and the input shaft 22 does not necessarily have to be restrained, as long as the generation of the rattle noises in the clearance around the axis in at least one spline connection between the continuously-variable transmission 24 and the input shaft 22 is restrained.

In the above-described embodiment, the generation of the rattle noises during the forward running in the gear running mode with the first drive-force transmitting path PT1 being established is restrained. However, the present invention can be applied also to the generation of the rattle noises during the reverse running in the gear running mode. That is, during the reverse running in the gear running mode, as well as during the forward running in the gear running mode, it may be determined that there is the probability of generation of the rattle noises in the clearance around the axis in the spline connection located between the input shaft 22 and the continuously-variable transmission 24, so that the generation of the rattle noise can be restrained by application of the present invention.

In the above-described embodiment, the control-start requirement consists of the conditions (1a)-(8a). However, the control-start requirement may consist of only the four conditions (1a), (2a), (6a) and (7a) each of which is categorized as the noise generation condition. Further, the control-start requirement may be satisfied with satisfaction of the condition (1a) and satisfaction of at least one of the conditions (2a), (6a) and (7a). Moreover, in the control-termination requirement consists of the conditions (1b)-(8b), such that the control-termination requirement is satisfied with satisfaction of at least one of the conditions (1b)-(8b). However, the control-termination requirement may consist of the four conditions (1b), (2b), (6b) and (7b) each of which is categorized as the noise generation condition. Further, the control-termination requirement may be satisfied with satisfaction of the condition (1b) and satisfaction of at least one of the conditions (2b), (6b) and (7b). The control-termination requirement may be modified as long as it can be determined that the vehicle driving apparatus 90 is in an operating state that is different from or other than the first operating state in which there is the probability of generation of the noises in the gear running mode when the modified control-termination requirement is satisfied. Where the control-start requirement is modified as described above, too, it is possible to determine whether the vehicle driving apparatus 90 is in the first operating state (with the probability of generation of the noises in the gear running mode) or an operating state that is different from the first operating state. When it is determined that the vehicle driving apparatus 90 is in the first operating state, the execution of the belt-clamping-force increasing control by the belt-clamping-force controlling portion 106 is started whereby the generation of the noises is restrained.

In the above-described embodiment, the control-start requirement and the control-termination requirement relating to the vehicle driving apparatus 90 of the vehicle 10 are opposite to each other, so that the control-termination requirement is not satisfied when the control-start requirement is satisfied, and so that the control-start requirement is not satisfied when the control-termination requirement is satisfied. However, when the control-start requirement is once satisfied and then becomes not satisfied, the control-termination requirement does not have to be necessarily satisfied. For example, when it may be determined that the vehicle driving apparatus 90 of the vehicle 10 is in a third operating state after it is determined by the first-operating-state determining portion 102 that the vehicle driving apparatus 90 is in the first operating state before it is determined by the second-operating-state determining portion 104 that the vehicle driving apparatus 90 is in the second operating state, wherein the third operating state is different from or other than the first and second operating states. In this modification, when the control-start requirement is once satisfied and the belt clamping force Cp is increased to be larger than in the second operating state, the belt clamping force Cp is not returned to an unincreased value immediately when the control-start requirement becomes unsatisfied. That is, the belt-clamping-force controlling portion 106 keeps execution of the belt-clamping-force increasing control even when the vehicle driving apparatus 90 is placed in the third operating state after it is determined by the first-operating-state determining portion 102 that the vehicle driving apparatus 90 is in the first operating state. Therefore, this arrangement in the modification makes it possible to avoid a situation in which the increase and reduction of the belt clamping force Cp are made frequently repeatedly, for example, when the operating state of the vehicle driving apparatus 90 remains in the vicinity of border between the satisfaction of the control-start requirement and the satisfaction of the control-termination requirement thereby causing frequent switching between satisfaction of the control-start requirement and satisfaction of the control-termination requirement.

Specifically described, among the above-described conditions (1a)-(8a), the control-execution withholding conditions, for example, the condition (8a) may be removed. Further, the control-start requirement and the control-termination requirement may be modified such that each of the conditions (1a)-(8a) and a corresponding one of the conditions (1b)-(8b) are not opposite to each other, for example, in terms of the threshold value or range. In either of these modifications, even if the control-start requirement becomes unsatisfied after the control-start requirement is once satisfied, the control-termination requirement is not necessarily satisfied.

As an example of the modification in which the control-start requirement and the control-termination requirement are not opposite to each other in terms of the threshold value or range, the conditions (2a), (2b) may be modified such that the condition (2a) is that the C1-drum rotational speed Nc1 is within a given speed range between Nc1_L1 and Nc1_H1 and the condition (2b) is that the C1-drum rotational speed Nc1 is outside another given speed range between Nc1_L1 and Nc1_H2, wherein Nc1_H2 is higher than Nc1_H1 (Nc1_H2>Nc1_H1).

Figure 6:
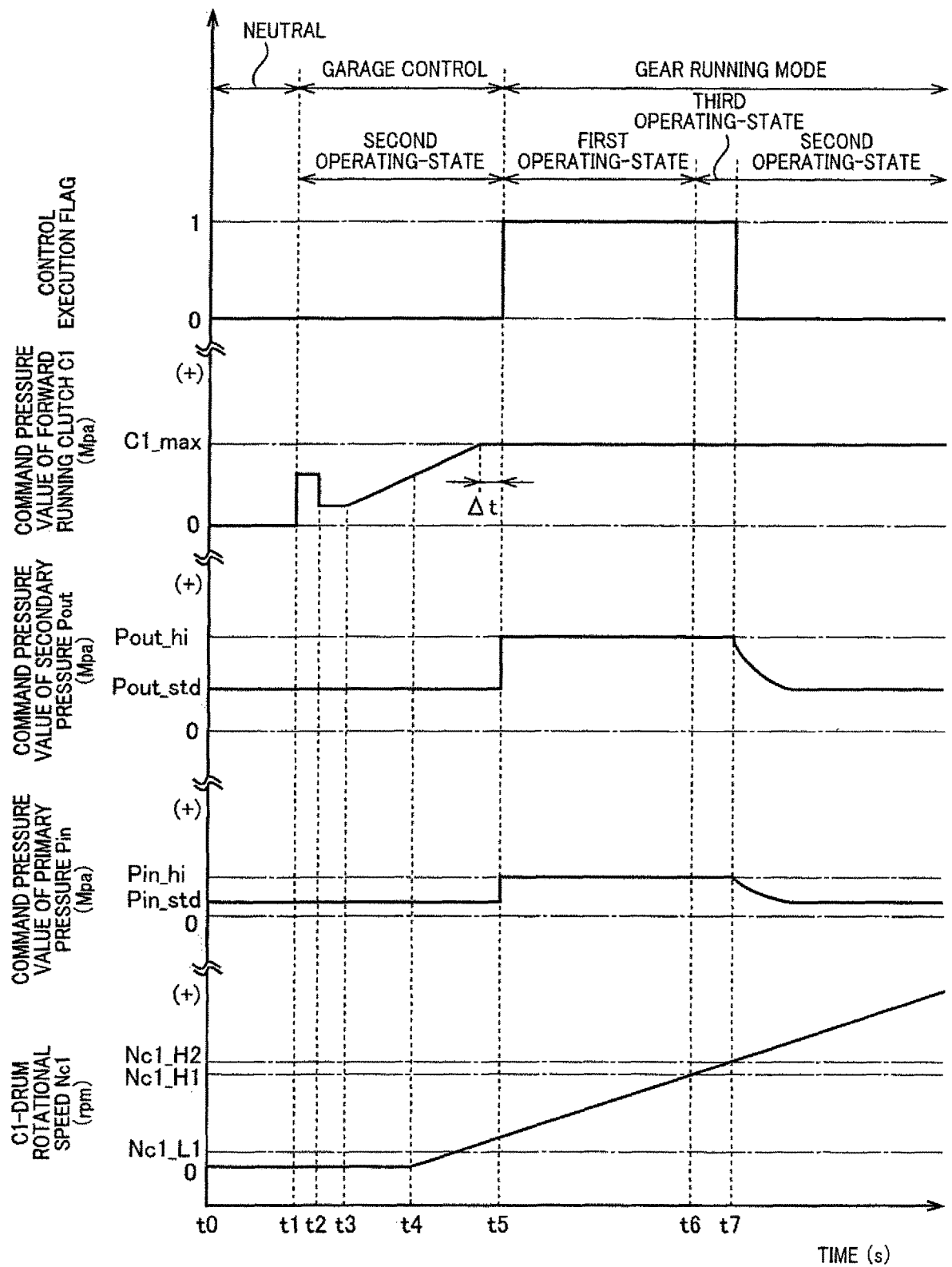
FIG. 6 is a time chart showing a control operation according to a modification of the embodiment of the invention, which is executed by the electronic control apparatus shown in FIG. 1, for controlling supply of the secondary pressure and the primary pressure, so as to restrain generation of noises between the belt-type continuously-variable transmission and the input shaft of the drive-force transmitting apparatus.

FIG. 6 is a time chart showing a control operation according to the modification of the embodiment of the invention, which is executed by the electronic control apparatus 100 shown in FIG. 1, for controlling supply of the secondary pressure Pout and the primary pressure Pin, so as to restrain generation of the noises between the belt-type continuously-variable transmission 24 and the input shaft 22 of the drive-force transmitting apparatus 16, wherein the control-start requirement and the control-termination requirement are not opposite to each other in terms of the threshold value or range. The time chart of FIG. 6 is substantially the same as that of FIG. 5 but is different from that of FIG. 5 in that the first operating state is switched to the second operating state via the third operating state in the gear running mode. In the time chart of FIG. 5, the first operating state is switched directly to the second operating state, as described above. Therefore, the different parts will be mainly described, and descriptions relating to the other parts common to the time charts of the FIGS. 5 and 6 will be omitted as needed. The time charts of FIGS. 5 and 6 are the same in the stage from the point t0 of time to the point t6 of time. However, in the time chart of FIG. 6, at the point t6 of time, the C1-drum rotational speed Nc1 exceeds Nc1_H1 but does not exceed Nc1_H2, so that the control-start requirement becomes unsatisfied and the control-termination requirement is still unsatisfied. Thus, at the point t6 of time, the control execution flag is kept at "1". At a point t7 of time, the C1-drum rotational speed Nc1 exceeds Nc1_H2, so that the control-termination requirement becomes satisfied whereby the control execution flag is changed from "1" to "0". In a stage between the point t6 of time and the point t7 of time, the vehicle driving apparatus 90 is placed in the third operating state that is different from the first and second operating states. After the point t7 of time, the control execution flag is "0", so that the belt-clamping-force reducing control is started whereby the command pressure value of the secondary pressure Pout is returned from the increased pressure value Pout_hi to the standard pressure value Pout_std and the command pressure value of the primary pressure Pin is returned from the increased pressure value Pin_hi to the standard pressure value Pin_std. It is noted that the descriptions of the control functions and operations with reference to FIGS. 1 and 4 can be applied also to this modification, because merely the control-start requirement and the control-termination requirement are slightly different from in the above-described embodiment although the third operating state is added between the first and second operating states.

In the above-described embodiment, the condition (2a) constituting the control-start requirement is that the C1-drum rotational speed Nc1 corresponding to the primary input-shaft rotational speed Npri is within the given speed range. However, this condition (2a) many be modified. For example, a rotational speed corresponding to the primary input-shaft rotational speed Npri can be detected by any of speed sensors provided in the gear-mechanism counter shaft 50, output shaft 30, counter shaft 32 and other rotary elements provided in a drive-force transmitting path between the input shaft 22 and the drive wheels 14. Therefore, the condition (2a) may be modified such that the modified condition is that a rotational speed of any one of the rotary elements provided in the drive-force transmitting path between the input shaft 22 and the drive wheels 14, which corresponds to the primary input-shaft rotational speed Npri, is within a given speed range. A satisfaction of the thus modified condition is synonymous with the satisfaction of the condition (2a).

In the above-described embodiment, the condition (6a) constituting the control-start requirement is that the throttle opening degree Tap is not larger than the given degree value Tap_j. The determination as to whether the condition (6a) is satisfied or not does not have be made necessarily by directly detecting the throttle opening degree Tap, but may be made, for example, by detecting the accelerator operation amount θacc (%) by the accelerator-operation amount sensor 74 such that the condition (6a) is determined to be satisfied when the accelerator operation amount θacc is not larger than a given amount value. The determination based on the accelerator operation amount θacc is synonymous with the determination based on the throttle opening degree Tap.

In the above-described embodiment, the second operating state is a predetermined operating state in which it is determined that there is no probability of generation of the noises between the input shaft 22 and the continuously-variable transmission 24 in the gear running mode with the first drive-force transmitting path PT1 being established. However, for example, the second operating state may be a predetermined state in which it is determined that the noises are generated by a degree by which uncomfortable feeling is given to the vehicle operator by a smaller degree than in the first operating state, or more preferably, in which it is determined that the noises are generated by so small degree that does not give uncomfortable feeling to the vehicle operator. In such a modification, too, it is possible to restrain generation of the rattle noises between the input shaft 22 and the continuously-variable transmission 24, without causing control interference in the connecting/disconnecting device upon switching of the drive-force transmitting path. Further, in this modification, the operating state of the vehicle driving apparatus 90 is returned from the first operating state to the second operating state earlier whereby the belt-clamping-force reducing control is started earlier than in the above-described embodiment, so that a load of the drive force source is further reduced and an efficiency of energy utilization of the drive force source such as the fuel efficiency is further improved.

Further, in the above-described embodiment, upon execution of the belt-clamping-force increasing control, the belt clamping force Cp is increased to a force value that avoids generation of the noises when the vehicle driving apparatus 90 of the vehicle 10 is in the first operating state. However, for example, upon execution of the belt-clamping-force increasing control, the belt clamping force Cp may be increased to a force value that reduces generation of the noises such that a smaller degree of uncomfortable feeling is given to the vehicle operator as compared with a case in which the belt clamping force Cp is not increased, or more preferably, may be increased to a force value that more reduces generation of the noises such that uncomfortable feeling is not given to the vehicle operator, wherein the increased force value can be pre-obtained through experimentation or design theory. In such a modification, too, it is possible to restrain generation of the rattle noises between the input shaft 22 and the continuously-variable transmission 24, without causing control interference in the connecting/disconnecting device upon switching of the drive-force transmitting path. Further, in this modification, the belt clamping force Cp upon execution of the belt-clamping-force increasing control is lower, namely, the increased pressure value Pout_hi and the increased pressure value Pin_hi are lower than in the above-described embodiment, so that a load of the drive force source is further reduced and an efficiency of energy utilization of the drive force source such as the fuel efficiency is further improved.

It is to be understood that the embodiment described above is given for illustrative purpose only, and that the present invention may be embodied with various modifications and improvements which may occur to those skilled in the art.

NOMENCLATURE OF ELEMENTS

16: drive-force transmitting apparatus
22: input shaft
24: belt-type continuously-variable transmission
28: gear mechanism
30: output shaft
58: primary pulley
60: secondary pulley
90: vehicle driving apparatus
100: electronic control apparatus (control apparatus)
102: first-operating-state determining portion
104: second-operating-state determining portion
106: belt-clamping-force controlling portion
B1: reverse running brake (first connecting/disconnecting device)
C1: forward running clutch (first connecting/disconnecting device)
C2: belt running clutch (second connecting/disconnecting device)
Cp: belt clamping force
D1: dog clutch (first connecting/disconnecting device)
Npri: primary input-shaft rotational speed
Pout: secondary pressure
PT1: first drive-force transmitting path
PT2: second drive-force transmitting path
Tap: throttle opening degree
Tho: working fluid temperature

What is claimed is:

1. A control apparatus for a vehicle driving apparatus that includes an input shaft, an output shaft, a gear mechanism and a continuously-variable transmission,
the continuously-variable transmission including pulleys and a transmission belt looped over the pulleys,
the vehicle driving apparatus being configured to establish a selected one of first and second drive-force transmitting paths between the input and output shafts, such that a drive force is transmitted through the gear mechanism when the first drive-force transmitting path is established, and such that the drive force is transmitted through the continuously-variable transmission when the second drive-force transmitting path is established,
said control apparatus comprising:
a first-operating-state determining portion configured to determine whether the vehicle driving apparatus is in a first operating state, by determining at least (i) whether the first drive-force transmitting path is established and (ii) whether there is a probability that noises are to be generated between the input shaft and the continuously-variable transmission, and configured to determine that the vehicle driving apparatus is in said first operating state when determining at least that the first drive-force transmitting path is established and that there is said probability; and
a belt-clamping-force controlling portion configured to control a belt clamping force by which the transmission belt is clamped by each of at least one of the pulleys, and configured, when it is determined by said first-operating-state determining portion that the vehicle driving apparatus is in said first operating state, to start execution of a belt-clamping-force increasing control for increasing the belt clamping force such that the belt clamping force is made larger when the vehicle driving apparatus is in said first operating state than when the vehicle driving apparatus is in an operating state that is different from said first operating state.

2. The control apparatus according to claim 1, further comprising:
a second-operating-state determining portion configured to determine whether the vehicle driving apparatus is in a second operating state which is different from said first operating state and in which the first drive-force transmitting path is established,
wherein said belt-clamping-force controlling portion is configured, when it is determined by said second-operating-state determining portion that the vehicle driving apparatus is in said second operating state, to execute a belt-clamping-force reducing control for reducing the belt clamping force such that the belt clamping force is returned to an unincreased value that is a value before the execution of said belt-clamping-force increasing control.

3. The control apparatus according to claim 2,
wherein said belt-clamping-force controlling portion is configured to keep the execution of said belt-clamping-force increasing control, when the vehicle driving apparatus is placed in a third operating state that is different from said first and second operating states after it is determined by said first-operating-state determining portion that the vehicle driving apparatus is in said first operating state and before it is determined by said second-operating-state determining portion that the vehicle driving apparatus is in said second operating state.

4. The control apparatus according to claim 1,
wherein the pulleys of the continuously-variable transmission include a primary pulley and a secondary pulley that is to receive the drive force transmitted from the input shaft through the primary pulley and the transmission belt,
wherein the secondary pulley includes a hydraulic actuator that is configured to control a width of a V-shape groove of the second pulley, based on a hydraulic pressure supplied to the hydraulic actuator, and
wherein said belt-clamping-force increasing control is a control executed to increase the hydraulic pressure supplied to the hydraulic actuator of the secondary pulley.

5. The control apparatus according to claim 1,
wherein the vehicle driving apparatus further includes an engine as a drive force source configured to generate the drive force, at least one first connecting/disconnecting device configured to selectively connect and disconnect the first drive-force transmitting path, and at least one second connecting/disconnecting device configured to selectively connect and disconnect the second drive-force transmitting path,
wherein the pulleys of the continuously-variable transmission include a primary pulley and a secondary pulley that is to receive the drive force transmitted from the input shaft through the primary pulley and the transmission belt,
wherein the belt clamping force is increased, when the at least one first connecting/disconnecting device and the at least one second connecting/disconnecting device are controlled to connect the first drive-force transmitting path and to disconnect the second drive-force transmitting path, respectively, and at least one of a plurality of conditions is satisfied, and
wherein said plurality of conditions include (i) a first condition that a rotational speed of a primary input shaft of the primary pulley is within a given speed range, (ii) a second condition that an opening degree of a throttle valve provided in the engine is not larger than a given value and (iii) a third condition that a temperature of a working fluid used in the vehicle driving apparatus is within a given temperature range.

6. The control apparatus according to claim 1,
wherein the vehicle driving apparatus further includes an engine as a drive force source configured to generate the drive force,
wherein said first-operating-state determining portion is configured to determine whether the vehicle driving apparatus is in said first operating state, by further determining at least whether an opening degree of a throttle valve provided in the engine is larger than a given value, and to determine that the vehicle driving apparatus is in said first operating state when determining at least that the first drive-force transmitting path is established, that there is said probability and that the throttle opening degree is not larger than said given value.

7. The control apparatus according to claim 1,
wherein said first-operating-state determining portion is configured to determine whether there is said probability, based on at least a rotational speed of the input shaft of the vehicle driving apparatus and a temperature of a working fluid used in the vehicle driving apparatus.

* * * * *